Feb. 5, 1935.  H. K. SNYDER  1,990,006
TRAP
Filed Dec. 11, 1933
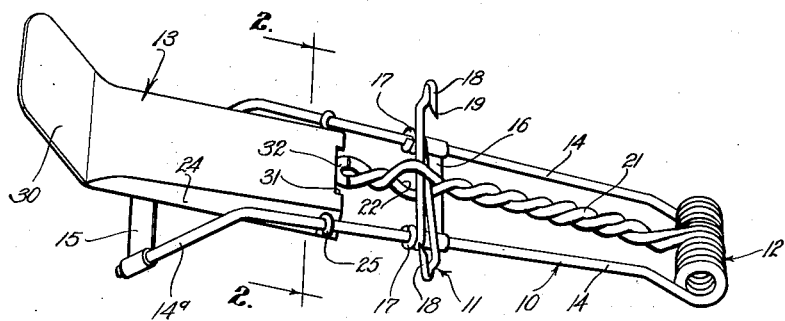
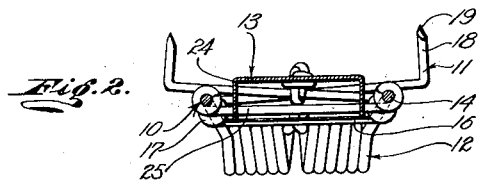
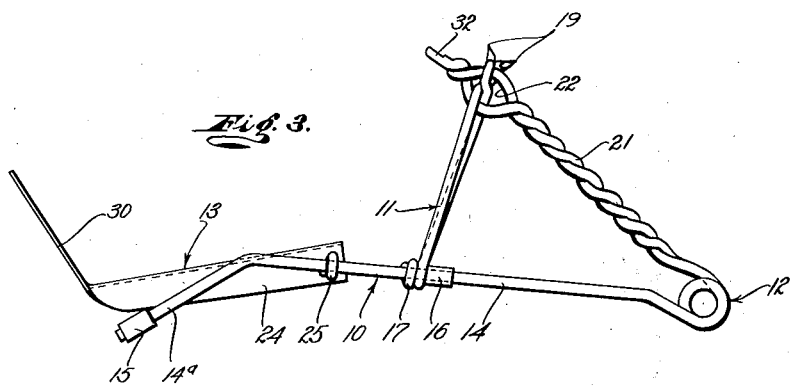
Inventor
Hugh K. Snyder
By
His Attorney

UNITED STATES PATENT OFFICE 1,990,006

TRAP

Hugh K. Snyder, Los Angeles, Calif.

Application December 11, 1933, Serial No. 701,847

4 Claims. (Cl. 43—91)

This invention relates to a trap and relates more particularly to a trap for snaring or trapping gophers, ground squirrels, etc. It is a general object of the present invention to provide a simple, practical and improved gopher trap.

It is another object of the invention to provide a gopher trap that is very sensitive and that is adapted to be sprung or set off by the gopher's weight or by the weight of soil the gopher may push through the burrow immediately in front of him, as distinguished from the traps that have heretofore been introduced that must be sprung by a push or a force exerted by the gopher.

It is another object of the invention to provide a trap of the character mentioned that includes a strong efficient spring for operating the jaws and a pivoted treadle or platform that acts as a trigger to hold the jaws against operation and that releases the spring to operate the jaws when a gopher or the like steps upon it or pushes against it.

It is another object of the invention to provide a gopher trap of the character mentioned that does not include any trigger or latch parts in addition to the platform mentioned above. In accordance with the present invention, the pivoted platform has direct trigger or latching engagement with the jaw operating lever of the spring and the trap does not involve long wire latches and the like present in the common traps.

It is another object of the invention to provide a trap of the character mentioned above in which the platform may be bent at will so as to adapt the trap for use in various situations.

It is a further object of the invention to provide an improved gopher trap that is simple and inexpensive of manufacture.

Other objects and features of the invention will be made apparent from the following detailed description of a typical preferred form of the invention, throughout which description reference may be had to the accompanying drawing, in which:

Fig. 1 is a perspective view of the trap provided by the invention illustrating it in the set or unactuated position.

Fig. 2 is a transverse detailed sectional view taken substantially as indicated by line 2—2 on Fig. 1, and Fig. 3 is a side elevation of the trap showing the parts in the sprung or actuated positions.

The trap provided by my invention includes generally a body or frame 10, pivoted jaws 11 on the frame 10, a spring 12 for actuating the jaws 11 and a treadle or platform 13 for releasably holding the jaws 11 against operation.

The body or frame 10 carries the various parts of the device and is a simple structure adapted to be inserted in a gopher's burrow or positioned at the mouth of a burrow. In the simple preferred form of the invention illustrated in the drawing, the frame 10 includes two spaced longitudinal side members or parts 14. The parts 14 are slightly divergent and extend from one end of the frame to the other. The outer end portions 14ª of the parts 14 are preferably bent downwardly and are connected by a suitable strap or cross bar 15. A similar strap or cross bar 16 may extend between and connect the frame parts 14 at a point between their ends. The operating spring 12 connects the inner ends of the side parts 14 as will be subsequently described.

The jaws 11 are pivoted on the side parts 14 of the frame 10 and are arranged in crossed relation as illustrated throughout the drawing. In the simple embodiment illustrated, the jaws 11 are in the nature of lengths of wire. The lower portions 17 of the jaws 11 are more or less loosely wrapped or twisted about the side parts 14 in a manner so that the jaws are free to swing or pivot. The jaws 11 are pivoted on the side parts 14 in the manner just described at points immediately adjacent the outer edge of the intermediate connecting bar 16 which bar holds the jaws against inward movement along the frame. The upper or outer portions 18 of the jaws 11 are bent laterally with respect to the major longitudinal portions of the jaws so as to oppose one another or mesh with one another when the jaws are actuated. The active ends 19 of the lateral jaws 18 may be suitably sharpened.

The jaw actuating spring 12 forms an integral connection between the inner ends of the frame side parts 14 being an integral part of the length of wire of which the parts 14 are formed. The spring 12 is a helical or spiralled torsional spring and is normally under a substantial torsional strain. In accordance with the invention a lever 21 projects longitudinally forward from a point between the opposite ends of the spring 12. The lever 21 is preferably integral with the wire of the spring 12 and in the case illustrated consists of a loop of the wire twisted longitudinally as illustrated throughout the drawing. The lever 21 formed as just described is an elongate substantially rigid part forming the actuating element of the spring 12. It is a feature of the invention that the lever 21 is operatively connected with the jaws 11 and may be releasably held against movement by the platform 13. The windings or convolutions of the lever 21 are spread apart or separated adjacent the outer end of the lever to provide an opening 22.

The major longitudinal portions of the jaws 11 freely and slidably pass through the opening 22 in the lever. The jaws 11 cross one another where they pass through the opening 22 and the active lateral portions 18 of the jaws are located above the lever 21. It will be obvious how the lateral portions 18 of the jaws limit the upward movement of the spring lever 21 and prevent the jaws from passing upwardly out of the opening 22 when the trap is sprung or actuated. The spring 12 is wound so that it normally urges the lever 21 upwardly with considerable force and the lateral portions 18 of the jaws limit this upward movement of the lever when the trap is in the actuated or sprung position, thus maintaining the torsional strain in the spring. The engagement of the lever 21 with the jaws 11 is such that the jaws have their active portions 18 spaced a substantial distance apart and at the opposite sides of the frame 10 when the lever is in its down position and causes the active portions 18 of the jaws to suddenly move together or toward one another with considerable force when the lever is permitted to spring upwardly. The opening 22 is sufficiently large to allow the jaws 11 to have free sliding engagement with the lever 21 so that they have no tendency to bind in the opening.

The treadle or platform 13 is pivoted on the frame 10 and serves as a trigger for releasably holding the jaws 11 against operation. The platform 13 is disposed between the side parts 14 and is arranged longitudinally of the frame 10 so that it projects or extends beyond the outer end of the frame. In practice the platform 13 may be formed of sheet metal and may have downwardly projecting longitudinal flanges 24 to give it rigidity. A member 25 of wire or the like extends between the side parts 14 and passes through openings in the flanges 24 to pivotally support the platform. In accordance with the invention the platform 13 is pivotally supported adjacent its inner end and at a point spaced outwardly from the jaws 11. It is a feature of the invention that the platform 13 is provided with an outer projecting portion 30 that is flexible and capable of being bent to various positions. The outer portion 30 of the platform is plain, being without flanges, so that it may be more readily bent. In most instances it may be desirable to have the outer portion 30 of the platform bent to project upwardly in the manner illustrated throughout the drawing so as to form a barrier against which the gopher must push in order to pass outwardly through his burrow.

The inner end portion of the platform 13 adjacent pivotal axis of the platform is adapted to have releasable latching or holding engagement with the lever 21 to hold the jaws 11 in the set or unactuated positions. A notch 31 may be provided in the inner edge of the platform 13. The outer end portion of the spring lever 21 is adapted to have trigger or latching engagement with the under side of the platform 13 at or adjacent the notch 31. The lever 21 is preferably provided with a flat end part 32 for cooperating with the underside of the platform 13. The parts are positioned and related so that the end portion 32 of the lever has limited engagement with the underside of the platform 13 at a point directly above or substantially directly above the pivotal axis of the platform. The lever 21 may be made to have this engagement with the platform 13 by forcing the lever downwardly against the action of the spring 12 to a substantially horizontal position so that its outer end part 32 may be latched under the platform 13 at its notch 31. In practice the platform 13 is comparatively long so that only a slight pressure on its outer portion causes it to pivot and release the lever 21 whereby the spring 12 actuates the jaws.

It is believed that the utility and the practicability of the trap provided by my invention will be readily apparent from the foregoing detailed description. The trap may be easily and safely set before being positioned in or adjacent to the burrow of the gopher. To set the trap the lever 21 may be forced or pushed downwardly with a thumb or finger without danger of injury. When the spring lever 21 has been pushed downwardly to a substantially horizotal position its outer end part 32 may be easily latched under the platform 13 at the notch 31. The extent of this latching or trigger cooperation of the lever 21 with the platform 13 may be varied to some extent to make the trap more or less sensitive. The engagement of the lever 21 with the platform 13 holds the lever 21 against upward movement until the platform 13 is disturbed. As described above, the jaws 11 have their active portions 18 in spread or separated positions when the lever 21 is latched under the platform. When set the trap may be handled and positioned in the burrow without danger of being prematurely sprung or set off. If desired or found necessary the outer end portion 30 of the platform 13 may be bent to a suitable inclination prior to the setting of the trap. The platform 13 is positioned between the side parts 14 of the frame at a point beyond the jaws 11 so that the gopher or other animal passing through the trap must engage or step upon the platform. Further, the upstanding portion 30 of the platform forms a barrier against which the gopher must engage or push when passing through his burrow. Any slight pressure or weight applied to the comparatively long platform 13 pivots the platform to release it from the lever 21 so that the lever is suddenly and forcibly swung upwardly by the spring 12 causing the jaws 11 to be actuated. The jaws 11 are positioned so that their active portions 18 are adapted to engage and grip the mid-portion of a gopher that has reached a position where he has engaged the platform 13. The spring 12 is such that the jaws 11 are maintained or held in tight retaining engagement with the gopher.

Having described only a typical preferred form and application of my invention, I do not wish to limit myself to the specific details set forth but wish to reserve to myself any changes or variations that may appear to those skilled in the art or that fall within the scope of the following claims:

Having described my invention, I claim:

1. A trap including a body, jaws on the body, a spring on the body having a part which has actuating cooperation with the jaws, and a platform latching the said part against movement and movable to release from said part, the platform having an upstanding portion projecting from the body to form a barrier in a burrow.

2. A gopher trap including a frame, pivoted jaws on the frame, a spiralled torsional spring on the frame, the material of the spring having a loop twisted to constitute a lever on the spring, the convolutions of the lever being spread to provide an opening in the lever through which the jaws slidably pass in crossed relation and a trigger holding the lever against operation in a position where the jaws are spread and releasable from the lever upon being disturbed.

3. A gopher trap including a frame, pivoted jaws on the frame, a spiralled torsional spring on the frame, the material of the spring having a loop twisted to constitute a lever on the spring, the convolutions of the lever being spread to provide an opening in the lever through which the jaws slidably pass in crossed relation and a platform on the frame whose inner end portion has releasable engagement with the lever to hold the jaws in a spread position, the outer portion of the platform projecting from the frame and being engageable to release the lever.

4. A trap including a frame comprising spaced longitudinal side parts, a jaw pivoted on each side part, a spring extending between the side parts at one end of the frame, a lever on the spring having actuating engagement with the jaws, and a pivoted platform arranged longitudinally between the side parts so that its inner end may have releasable holding cooperation with lever, the platform projecting outwardly beyond the other end of the frame and engageable to release said inner end from the lever whereby the spring may actuate the jaws.

HUGH K. SNYDER.